United States Patent [19]

Schneider et al.

[11] Patent Number: 5,562,826
[45] Date of Patent: Oct. 8, 1996

[54] SEMIPERMEABLE, POROUS, ASYMMETRIC POLYETHER AMIDE MEMBRANES

[75] Inventors: Jürgen Schneider, Waldems; Reinhard Wagener, Kelkheim; Willi Kreuder, Mainz; Ulrich Delius, Frankfurt am Main; Jürgen Wildhardt, Hünstetten, all of Germany

[73] Assignee: Hoechst Aktiengesellschaft, Germany

[21] Appl. No.: 129,573

[22] Filed: Sep. 29, 1993

Related U.S. Application Data

[63] Continuation-in-part of Ser. No. 970,481, Oct. 23, 1992, abandoned.

[30] Foreign Application Priority Data

Oct. 26, 1991 [DE] Germany ............... 41 35 341.2

[51] Int. Cl.⁶ .................. B01D 69/10; B01D 71/56; B01D 67/00
[52] U.S. Cl. .............. 210/490; 210/500.23; 210/500.38; 264/41
[58] Field of Search .............. 210/500.37, 500.38, 210/500.39, 651, 654, 490, 500.23, 500.28, 500.33; 427/244–246; 96/14, 13; 264/4, 45.1

[56] References Cited

U.S. PATENT DOCUMENTS

| | | | |
|---|---|---|---|
| 3,567,632 | 3/1971 | Richter et al. | 210/500.38 |
| 3,615,024 | 10/1971 | Michaels . | |
| 4,217,227 | 8/1980 | Elfert et al. | 210/500.38 |
| 4,229,291 | 10/1980 | Walch et al. | 210/500.38 |
| 4,454,176 | 6/1984 | Buckfelder et al. | 427/246 |
| 4,627,992 | 12/1986 | Badenhop et al. | 427/244 |
| 4,720,343 | 1/1988 | Walch et al. | 210/500.38 |
| 4,891,135 | 1/1990 | Haubs et al. | 210/500.38 |
| 4,959,151 | 9/1990 | Nakatani et al. | 210/654 |
| 5,085,676 | 2/1992 | Ekiner et al. | 55/158 |
| 5,152,894 | 10/1992 | Haubs et al. | 210/500.38 |

FOREIGN PATENT DOCUMENTS

| | | |
|---|---|---|
| 077691 | 4/1983 | European Pat. Off. . |
| 0082433 | 3/1986 | European Pat. Off. . |
| 382009 | 8/1990 | European Pat. Off. . |
| 489418 | 6/1992 | European Pat. Off. . |
| 501425 | 9/1992 | European Pat. Off. . |
| 3342823 | 6/1985 | Germany . |
| 1299604 | 12/1989 | Japan . |
| 8808738 | 11/1988 | WIPO . |

OTHER PUBLICATIONS

Patent abstracts of Japan, vol. 14, No. 086 published Feb. 19, 1990.
S. Souriajan, Reverse Osmosis, Logos Press, London 1970.
Desalination, 35 (1980) 5–20.
Mark C. Porter, "Handbook of Industrial Membrance Technology", 1990, p. 149 et seq.
Mark C. Porter, "Handbook of Industrial Membrane Technology", 1990, p. 149 et seq.

*Primary Examiner*—Joseph W. Drodge
*Attorney, Agent, or Firm*—Curtis, Morris & Safford, P.C.

[57] ABSTRACT

A semipermeable, porous, asymmetric membrane containing a polyetheramide which contains at least one or more dicarboxylic acid derivatives and aromatic diamines having a portion. The membrane is suitable for applications where contamination by glycerol or other platicizers or pore fillers must not be tolerated, may be dried without using a pore filler such as glycerol, does not collapse upon drying, and are sufficiently hydrophobic to be wetted again after complete drying.

17 Claims, No Drawings

SEMIPERMEABLE, POROUS, ASYMMETRIC POLYETHER AMIDE MEMBRANES

This application is a continuation-in-part of application Ser. No. 07/970,481, filed Oct. 23, 1992, now abandoned.

Since the introduction of asymmetric membranes of cellulose acetate by Loeb and Sourirajan (S. Sourirajan, Reverse Osmosis, Logos Press, London 1970) and of hydrophobic polymers (U.S. Pat. No. 3,615,024) a number of membranes have been developed and proposed, in particular for separation of low and high molecular constituents dissolved in water, the structure and suitability of which are given in the literature (Desalination, 35 (1980), 5–20) and which have also been successfully tested in industrial practice or for clinical purposes.

Many of the membranes described have particularly advantageous properties for achieving specific tasks. As a result of their chemical constitution and their structure, each individual membrane can be optimally suited only for quite specific separation problems. From this results the fundamental requirement of continuously developing new membranes for new tasks.

EP-A 0 082 433 gives an overview of the advantages and disadvantages of membranes which are already known. Thus, for example, there are hydrophilic, asymmetric membranes of cellulose acetate having satisfactory antiadsorptive properties, but whose thermal and chemical stability leave a lot to be desired. Membranes of polysulfones or similar polymers do possess a good thermal and chemical stability, but such membranes, because of the hydrophobic properties of the polymers used, show a pronounced tendency to adsorb dissolved substances, as a result of which the membrane is blocked. The mixtures of polysulfone and polyvinylpyrrolidone disclosed in EP-A 0 082 433 do dispose of the disadvantage resulting from the hydrophobicity of the polysulfone, but these mixtures are sensitive to the action of organic solvents.

Hydrophilicity and simultaneous resistance to solvents are found in membranes of regenerated cellulose; but these can be relatively easily hydrolyzed in acid or alkaline media, and moreover they are easily attacked by microorganisms.

It is therefore an object of the invention to provide semipermeable, porous asymmetric membranes which are stable to chemical and thermal action, which can be prepared by a simple and economical method and whose membrane properties can be easily varied according to the area of application.

Membranes which substantially fulfill these requirements have been disclosed in U.S. Pat. No. 4,891,135 and U.S. Pat. No. 5,152,894. There is, however, still opportunity for further improvement of these types of polyaramide membranes. The afore-mentioned membranes display some disadvantages as far as processing is concerned. They cannot be obtained in dry form without pretreating them with a plasticizer or pore filler, e.g. glycerol. Otherwise the porous structure may collapse and hardly any permeability will be measured after rewetting of the membranes. Thus these membranes cannot be used for separation problems where contamination by glycerol or other plasticizers must not be tolerated, e.g. medical applications.

Furthermore the membrane forming polyaramides disclosed in U.S. Pat. No. 4,891,135 and U.S. Pat. No. 5,152,894 have only limited solubility in organic solvents, i.e. maximum concentration is $C_{max} \approx 8\%$ w/w. For membrane preparation, particularly in the form of hollow fibres, a higher solubility would be advantageous. It opens up the experimentator skilled in the art a broader range of preparation parameters, and thus introduces more flexibility into the membrane fabrication.

Surprisingly it was now found that the polyetheramide membranes of the instant invention overcome these problems. Those membranes can be dried in the glycerol-free form while retaining part of their permeability. Moreover the polycondensation may be carried out in solutions with concentrations $c \geq 20\%$ w/w, which makes both the polycondensation more economical and the membrane preparation more flexible.

The membranes according to the invention contain polyetheramides which comprise one or more of the recurring structural units of the formula (I)

and, based on the sum of (II) and (III), up to 15–100 molar % of structural units of formula (II)

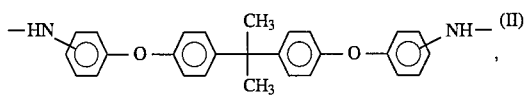

and, based on the sum of (II) and (III), 0–85 molar % of structural units of formula (III)

where the ratio of the sum of (II) and (III) to (I) is 0.90 to 1.10, but preferably 1.0 and the symbols —Ar— and —Ar'— may be equal or different and have the following meaning:

—Ar— and —Ar'— are a divalent, aromatic or heteroaromatic radical, where the two carbonyl groups are located on unadjacent ring carbon atoms (i.e. in para- or meta-position) and the Ar and Ar' radicals are unsubstituted or substituted by one or two branched or unbranched $C_1$–$C_3$-alkyl or $C_1$–$C_3$-alkoxy radicals, aryl or aryloxy radicals or $C_1$–$C_8$-perfluoroalkyl or $C_1$–$C_8$-perfluoroalkoxy radicals or by fluorine, chlorine, bromine or iodine, According to the invention therefore, for the formation of the polyaramides contained in the membrane, one or more dicarboxylic acid derivatives of the formula (I) and diamine components of the formula (II) and, possibly, (III) are necessary, the ratio of the sum of (II) and (III) to (I) being 0.90 to 1.10. Stoichiometric amounts of carboxylic acid derivatives and diamine components are preferably used.

To prepare the polyaramides required according to the invention, the following compounds are suitable: one or more dicarboxylic acid derivatives of the formula (I')

for example terephthalyl dichloride and/or isophthalyl dichloride, where the aromatic ring is unsubstituted or is substituted by one or two branched or unbranched $C_1$–$C_3$-alkyl or $C_1$–$C_3$-alkoxy radicals, aryl or aryloxy radicals or $C_1$–$C_6$-perfluoroalkyl or $C_1$–$C_6$-perfluoroalkoxy radicals or by fluorine, chlorine, bromine or iodine.

Aromatic diamines of formula (II')

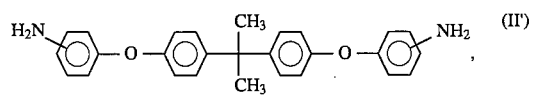

preferably 2,2'-bis[4-(4'-aminophenoxy)-phenyl]-propane and aromatic diamines of formula (III')

$$H_2N—Ar'—NH_2 \qquad (III'),$$

preferably para-phenylenediamine or meta-phenylenediamine or substituted derivatives of these diamines.

The solution condensation of aromatic dicarboxylic acid dichlorides of the formulae (I') with aromatic diamines of the formulae (II') and, possibly, (III') is carried out in aprotic polar solvents of the amide type, such as for example in N,N-dimethylacetamide or in particular in N-methyl-2-pyrrolidone (NMP). If required, halide salts of the first and second subgroup of the Periodic Table of Elements can be added to these solvents in a known manner to increase the dissolving power or to stabilize the polyamide solutions. Preferred additives are calcium chloride and/or lithium chloride.

The polycondensation temperatures are conventionally between −20° C. and +120° C., preferably between +10° C. and +100° C. Particularly good results are achieved at reaction temperatures between +10° C. and +80° C. The polycondensation reactions are preferably carried out so that after the reaction is completed, 3 to 50% by weight, preferably 5 to 35% by weight, of polycondensate is in the solution.

The polycondensation may be terminated by addition of monofunctional compounds, e.g. benzoyl chloride. This polycondensation method together with the good solubility of the polyetheramides of ≧20% w/w allows to vary the molecular weight and the polymer dope concentration almost independently. This gives considerable flexibility to the preparation of polymer dopes with suitable viscosity, particularly for hollow fibre membrane manufacture. After completion of the polycondensation, i.e. when the polymer solution has attained the Staudinger index required for further processing, the hydrogen chloride formed bound to the amide solvent is neutralized by addition of basic substances. Suitable substances for this are for example lithium hydroxide, calcium hydroxide, in particular calcium oxide. After neutralization, the solutions are filtered and degassed and membranes are drawn from these solutions. The concentration of the solutions and also the molecular weight of the polymers represent the most important production parameters, since by this means the membrane properties such as porosity, mechanical stability, permeability and retention capacity may be adjusted.

The Staudinger index is a measure for the mean chain length of the resulting polymers. The Staudinger index of the polyaramide is in the range of 50 to 1000 cm³/g, preferably in the range of 50 to 500 cm³/g. It was determined in solutions having 0.5 g of the particular polymer in 100 ml NMP at 25° C.

The Staudinger index [η] (limiting viscosity, intrinsic viscosity) is taken to mean the expression $$\lim_{C_2 \to} \frac{\eta_{sp}}{C_2} = [\eta]$$

where $C_2$=concentration of the dissolved substance $\eta_{sp}$=specific viscosity $$\eta_{sp} = \frac{\eta}{\eta_1} - 1$$

$\eta$=viscosity of the solution $\eta_1$=viscosity of the pure solvent

To produce the membrane according to the invention from polyaramides, the polyamide solution already described is filtered, degassed, and then, in a known manner using the phase inversion process (Robert E. Kesting, "Synthetic Polymeric Membranes", 2nd Ed , 1985, p 237 ff.), an asymmetric porous membrane is produced For this purpose the polymer solution is spread as a liquid layer on a support as flat as possible The flat support can for example comprise a glass plate or a metal drum. A precipitant liquid is then allowed to act on the liquid layer, which liquid is miscible with the solvent of the solution, but in which the polymers dissolved in the polymer solution are precipitated as a membrane.

Further suitable solvent constituents are readily volatile substances such as for example tetrahydrofuran, acetone or methylene chloride. Suitable precipitant liquids are water, mono- or polyhydricalcohols such as methanol, ethanol, isopropanol, ethylene glycol or glycerol, or, additionally, mixtures of these substances with each other or with aprotic, polar solvents such as N,N-dimethylformamide, N,N-dimethylacetamide, dimethyl sulfoxide, but in particular with N-methyl-2-pyrrolidone.

As a result of the action of the precipitant liquid on the liquid layer the polyaramides dissolved in the polymer solution are precipitated from this solution with the formation of a porous film having an asymmetric pore structure.

The separation efficiency and the rejection efficiency of the membranes according to the invention can be specifically varied by addition of polyvinyl pyrrolidone (PVP) to the solution of the polyaramide prior to the coagulation or by carrying out the polycondensation of the structural units (I), (II), and, possibly, (III) in the presence of PVP or by a subsequent treatment at a temperature in the range of 60°–140° C. preferably in the range of 60°–100° C., with a liquid, for example with water, mixtures of water with mono- or polyhydricalcohols or also for example polyethylene glycol, or with polar, aprotic solvents of the amide type, such as N-methylpyrrolidone, N,N-dimethylformamide, dimethyl sulfoxide or mixtures of these liquids with each other or alternatively by treatment with steam, which may be superheated.

A thermal post-treatment of the membranes according to the invention leads to a compression of the active layer, so that a subsequent adjustment of the rejection efficiency is possible in this manner.

As a result of the addition of polyvinylpyrrolidone to the polymer solution it is possible to achieve an increase in hydrophilicity and separation efficiency of the membranes according to the invention by preparation of a homogeneously miscible polymer blend and to achieve a better processability. The increased hydrophilicity of the integrally asymmetric membrane leads to a reduced blockluging tendency, i.e. to an expedient fouling behavior (lower decrease in flux per unit of time and stabilization of the product flux at a high level).

When there is an addition of polyvinylpyrrolidone, this is added in amounts of 1 to 80% by weight, preferably 5 to 70% by weight, particularly preferably 20 to 60% by weight, relative to the mass of the polyamide.

The molecular weight of the polyvinylpyrrolidone in this case is in the range from 10,000 to 2,000,000 dalton (g/mol) (given as weight average), preferably in the range from 20,000 to 1,000,000, particularly preferably in the range from 30,000 to 95,000 dalton.

When the process is carried out, the precipitant liquid is advantageously allowed to act on the membrane precipitated by this, until virtually all of the solvent in the membrane has been replaced by precipitant liquid. The membrane formed is then freed from precipitant liquid, for example by drying the membrane directly in an air stream having a relative humidity in the range from 20 to 100% or by first treating it with a softener such as glycerol, or glycerol/water mixtures and then drying it.

It is a particular advantage of the membranes from polyetheramides according to the invention that glycerol does not necessarily need to be used in order to stabilize the porous membrane structure.

To produce membranes which are arranged on a support layer, which is permeable to flowable media, the procedure as described above is carried out but the support used for forming the membrane layer is a fabric or a nonwoven web, for example of plastic, for example polypropylene, polyethylene and/or polyethylene terephthalate, or of paper and after the membrane layer has been formed this is left on the support. However, the membrane can alternatively be first prepared without a support and only then applied to a permeable support. Flat membranes produced in this manner have a thickness without support in the range from 10 to 300 µm, in particular in the range from 20 to 150 µm. In a known manner (Mark C. Porter, "Handbook of Industrial Membrane Technology", 1990, p. 149ff), hollow fibers and capillaries can alternatively be produced from the solution of the polyaramides, by spinning the polymer solution in accordance with the prior art through an appropriately designed shaping ring nozzle or hollow needle nozzle into a precipitant liquid. The wall thickness of such capillaries or hollow fibers is conventionally in the range from 20 to 500 µm, in particular 80–200 µm.

Spinning of hollow fiber membranes from the polyetheramide dopes according to the invention is flexible and efficient, because the dope viscosity may be adjusted both by variation of polymer molecular weight or polymer concentration.

The membranes according to the invention may be dried without using glycerol. The porous structure does not collapse as usually observed for hydrophilic, porous membranes. The polyetheramide membranes according to the invention is sufficiently hydrophilic to be wetted again after complete drying. This is often not the case for hydrophobic membranes. A dried and rewetted polyetheramide or polyetheramide/PVP blend membrane is still permeable to water at pressures well below 5 bar. Its permeability is somewhat lower as compared to the native, water-wet membrane. The permeability of a dried and rewetted polyetheramide membrane at 3 bar is higher than 10 l/m$^2$h, preferably higher than 25 l/m$^2$h. The membranes according to the invention thus are suited for applications where contamination by glycerol or other plasticizers or pore fillers must not be tolerated.

The membrane according to the invention, apart from standard applications of porous membranes known to those skilled in the art, such as pressure filtration (micro-, nano- and ultrafiltration), diafiltration and dialysis are likewise suitable as support membranes for selectively permeable layers (for example for gas separation, pervaporation) which are produced directly on or in the membrane. Thus for example "ultrathin" layers ($\leq 1$ µm) composed of polymers having functional groups (for example silicones, cellulose ethers, fluorine copolymers) can be spread on water, applied to the membrane surface from there and for example can be covalently fixed by reaction with a diisocyanate, in order to achieve more selective permeability by this means. Further methods for transfer of thin selectively permeable layers are known to those skilled in the art. By analogy, the membranes according to the invention are also suitable as supports for reactive molecules, for example to fix enzymes or anticoagulants such as heparin according to the prior art.

The thickness of the membranes according to the invention without support layer is in the range from 10 to 300 µm, in particular from 20 to 120 µm.

EXAMPLES

Membranes of homo- and copolyaramides

For the membranes studied in the examples, the corresponding polyaramides were prepared as described above in N-methylpyrrolidone (NMP) as solvent by a polycondensation at 50° C.

A solution of this polyaramide was applied to a nonwoven support web of polypropylene and was coagulated in water at 20° C.

The permeate flux of an ultrafiltration membrane produced in this manner and the rejection efficiency for dissolved macromolecules were determined at pressures of 3.0 bar at 20° C. in a stirred cylindrical cell (500 rpm, 250 ml, membrane surface area 38 cm$^2$).

The rejection efficiency is by definition $$R = \frac{C_1 - C_2}{C_1} \; 100[\%]$$

$C_1$ is the concentration of the aqueous test solution,
$C_2$ is the concentration in the permeate.

| Example 1: | $\geq 95$ molar % of terephthalyl dichloride (TPC) 100 molar % of 2,2'-bis[4-(4'-aminophenoxy)phenyl]propane (BAP) |
|---|---|
| Example 2: | $\geq 95$ mol % (0.8 TPC + 0.2 isophthalic acid, dichloride (IPC)); 70 mol % BAP + 30 mol % paraphenylenediamine (PPD). |
| Example 3: | $\geq 95$ molar % of isophthalyl dichloride (IPC) 100 molar % of BAP |
| Example 4: | $\geq 95$ molar % of (0.8 TPC + 0.2 IPC) 100 molar % of BAP |
| Example 5: | $\geq 95$ mol % (0.8 TPC + 0.2 IPC); 70 mol % BAP + 30 mol % meta-phenylenediamine (MPD). |
| Comparative Example 6: | $\geq 95$ mol % TPC; 25 mol % PPD + 50 mol % 3,3'-dimethyl-4,4'-diamino-biphenyl + 25 mol % 1,4-bis(4'-aminophenoxy)-benzene. |

Test substances for the rejection determination and additives used:

The test solutions used were aqueous polyvinylpyrrolidone solutions and aqueous solutions of fractionated dextrans. The density measurements were carried out using a density measuring apparatus ®DA 210 from the Kyoto Electronics company.

| K30: | polyvinylpyrrolidone (MW 49,000) 2% strength aqueous solution | (® Luviskol K30, BASF), |
|---|---|---|
| T10: | dextran (MW 10,000) 1% strength aqueous solution | (® Dextran T10, Pharmacia), |
| T2000: | Dextrane (MW 1,000,000), 1% aqueous solution. | (® Dextran T2000, Pharmacia), |
| blue: | dextran with dye labeling (MW 2,000,000) 0.5% strength aqueous solution | (® Dextran blue, Pharmacia), |
| K90: | polyvinylpyrrolidone (MW 1,200,000) | (® Luviskol K90, BASF) |
| Aerosil: | pyrogenic silica gel | (® Aerosil 200, Degussa) |

EXAMPLE 1

Homopolyamide composed of 95 molar % of (I) (TPC) and 100 molar % (II) of (BAP)
[η] = 110 ml/g, polymer solution C$_2$ = 25% in NMP Flat membrane. stirred cell 500 rpm, pressure: 3 bar
1.1) Influence of the polymer concentration

| Concentration $C_2$ [%] | Membrane layer thickness [μm] | Water flux [l/m²h] | Rejection [%] K30 | Rejection [%] T10 | Permeate flux [l/m²h] K30 | Permeate flux [l/m²h] T10 |
|---|---|---|---|---|---|---|
| 25–20* | 380 | — | — | — | — | — |
| 17.5+ | 310 | 220 | 95 | 81 | 35 | 85 |
| 15+ | 280 | 510 | 94 | 68 | 35 | 81 |
| 12.5+ | 275 | 1145 | 78 | 2 | 38 | 585 |
| 10+ | 260 | 1860 | 76 | — | 38 | — |
| 7.5+ | 258 | 2630 | 30 | — | 85 | — |

*sealed membranes, no water outflow up to 40 bar.
+dextran blue solution is completely decolorized.

Using homopolyaramides of TPC and BAP, membranes can be produced in a very broad concentration range. If the viscosity is adjusted to [η]=110 ml/g, all membranes having a polymer concentration greater than 20% are not permeable to water and aqueous solutions up to 40 bar. As the polymer concentration falls, the permeability to water very sharply increases. The rejection values of the test substances K30 and T10 behave inversely. While the rejection of K30 only decreases gradually because of the broad molecular weight distribution of the polyvinylpyrrolidone, the rejection of dextran T10 (narrow molecular weight distribution) decreases very rapidly to values which can no longer be measured.

1.2) Influence of polyvinylpyrrolidone addition (PVP)
Polymer solution $C_2$ in NMP

| Polymer concentration $C_2$ [%] | PVP addition [%]* | Membrane layer thickness [μm] | Water flux [l/m²h] | Rejection [%] K30 | Rejection [%] T10 | Permeate flux [l/m²h] K30 | Permeate flux [l/m²h] T10 |
|---|---|---|---|---|---|---|---|
| 17.5 | 0 | 310 | 220 | 95 | 81 | 35 | 85 |
|  | 10 | 300 | 120 | 98 | 62 | 35 | 82 |
|  | 50 | 315 | 330 | 95 | 78 | 33 | 78 |
| 20 | 0 | 380 | — | — | — | — | — |
|  | 20 | 370 | 38 | — | 96 | — | 35 |

*relative to the polyaramide fraction

From the preceding table it can be seen that PVP-containing membranes, compared to PVP-free membranes, have an increased water flux, with approximately equal rejection efficiencies (see $C_2$=17.5% and PVP addition 0 and 50%). In addition it can be seen that a membrane produced from a 20% strength polymer solution which is not permeable to water is made permeable by PVP addition.

1.3) Influence of a subsequent thermal treatment on PVP-containing membranes
Polymer solution $C_2$ = 17.5 in NMP

| PVP addition [%]* | Thermal addition with water [min/°C.] | Membrane treatment thickness [μm] | Water flux [l/m²h] | Rejection [%] T10 | Permeate flux [l/m²h] T10 |
|---|---|---|---|---|---|
| 0Δ | —Δ | 310 | 220 | 81 | 85 |
|  | 10/100 | 290 | 55 | 97 | 47 |
| 30 | — | 310 | 100 | 84 | 76 |
|  | 10/100 | 300 | 120 | 90 | 75 |
| 50 | —Δ | 315 | 330 | 78 | 78 |
|  | 10/100 | 300 | 80 | 96 | 60 |

*relative to the polyaramide fraction
Δvalues are repeated for comparison (see 1.2)

A polyaramide membrane (from a 17.5% strength solution without PVP) is heated for 10 minutes at 100° C. in water. As a result of this treatment, analogous to a sintering process, the membrane covering layer compresses and the rejection value increases. While the K30 rejection is already quantitative from a heating temperature of 80° C. (not given in the table), the T 10 rejection increases from approximately 80% to 97%. A thermal treatment of this aramide membrane allows an individual membrane to be adjusted so that it can find an application in the ultrafiltration region and in the neighboring nano-filtration region.

If a thermal post-treatment is given to PVP-containing membranes, analogously to the case without PVP addition, a compression of the membrane covering layer results with increase of the rejection values for the test substances. Analogously to Table 1.2, higher permeabilities are also shown here with PVP-containing membranes in comparison to their PVP-free variants.

A 50% PVP addition and heating for 10 minutes at 100° C. gives a membrane having 96% rejection for T10 and a water flux of 80 l/m²h. The comparable membrane without PVP, at an approximately equal rejection of 97%, has a water flux of only 55 l/m²h.

1.4) Polyaramide hollow fiber membrane
Internal diameter ~1.2 mm
Stream flow rate 3–4 m/s, transmembrane pressure 3.5 bar
$C_2$ = 15% in NMP

| Thermal treatment [min/°C.] | Membrane layer thickness [μm] | Water flux [l/m²h] | Rejection [%] K30 | Permeate flux [l/m²h] |
|---|---|---|---|---|
| — | 250 | 40 | 76 | 20 |
| 10/100 | 220 | 30 | 80 | 15 |

A polyaramide hollow fiber is individually stretched between two needles and is tested with the aid of a pump and an externally applied pressure using the crossflow technique. The pressure is measured at the inlet and outlet of the hollow fiber and the transmembrane pressure (TMP) is determined therefrom [TMP=($P_E$+$P_A$/)2]

$P_E$=inlet pressure
$P_A$=outlet pressure

EXAMPLE 2

Copolyaramide from (0.8 TPC + 0.2 IPC) and (0.7 BAP + 0.3 PPD)
Polymer dope $c_2$ = 20% w/w in NMP, [η] = 110 cm³/g.

| Conc. c2 in NMP | additives (1) | membrane thickness (μm) | water flux (2) [l/m²h] | water flux (3) [l/m²h] | retention K30 | retention T2000 |
|---|---|---|---|---|---|---|
| 16% |  | 236–260 | 185 |  | 94% |  |
| 12% | 3% K30 | 277–300 | 2500 | 40 | 56% | 95% |
| 8% | 4% K90 | 270–286 | 1200 | 60 | <5% | 45% |
| 8% | 4% K90 2% Aerosil | 300–320 | 2600 | 58 | <3% | 40% |

-continued

Copolyaramide from (0.8 TPC + 0.2 IPC) and
(0.7 BAP + 0.3 PPD)
Polymer dope $c_2$ = 20% w/w in NMP, [η] = 110 cm³/g.

| Conc. $c2$ in NMP (1) | addi- tives | membrane thick- ness (μm) | water flux (2) (l/m²h) | water flux (3) (l/m²h) | retention K30 | T2000 |
|---|---|---|---|---|---|---|

(1) relative to the polymer solution
(2) water flux of the native, water wet membrane measured as given above
(3) water flux measured under identical conditions of a membrane sample dried for 16 h at room temperature. No glycerol or any other pore filler was used to stabilize the porous membrane structure.

EXAMPLE 3

Hompolyaramide composed of IPC and BAP
[η] = 75 ml/g $C_2$ in NMP

| Concentra- tion $C_2$ [%] | Addi- tions* | Membrane thickness [μm] | Water flux [l/m²h] | Rejection [%] K30 | Permeate flux [l/m²h] |
|---|---|---|---|---|---|
| 12 | — | 330 | 320 | 85 | 34 |
|  | 5% K30 | 340 | 530 | 88 | 36 |
|  | 5% K90 | 350 | 360 | 88 | 35 |
| 9 | — | 290 | 270 | 79 | 36 |
|  | 5% K30 | 290 | 690 | 79 | 36 |
|  | 5% K90 | 310 | 540 | 67 | 40 |
| 6 ■ Δ | 2.5% Aerosil | 270 | 2700 | <5 | 680 |
|  | 2.5% Aerosil 5% K90 | 280 | 610 | 47 | 53 |

*relative to the polymer solution
Δ polymer solution without additives, viscosity too low to draw membrane
■ dextran blue solution at 6% polymer concentration is no longer completely rejected.

EXAMPLE 4

Copolyamide composed of TPC, IPC and BAP
[η] = 100 ml/g
Polymer solution $C_2$ = 10% in NMP

| Additions* | Membrane layer [μm] thickness | Water flux [l/m²h] | Rejection [%] K30 | Permeate flux [l/m²h] |
|---|---|---|---|---|
| — | 300 | 186 | 84 | 34 |
| 5% K90 | 310 | 280 | 88 | 33 |
| 5% Aerosil | 330 | 210 | 92 | 30 |

*relative to the polymer solution
Dextran blue solution is completely decolorized

EXAMPLE 5

Copolyaramide from (0.8 TPC + 0.2 IPC) and
(0.7 BAP + 0.3 MPD)
Polymer dope $c_2$ = 20% w/w in NMP, [η] = 95 cm³/g

| Conc. $c2$ in NMP (1) | additives | membrane thick- ness (μ) | water flux (2) (l/m²h) | water flux (3) (l/m²h) | retention K30 | T2000 |
|---|---|---|---|---|---|---|
| 16% |  | 235–257 | 440 |  | 90% |  |
| 12% | 3% K30 | 274–296 | 2800 | 50 | 20% | 65% |
| 8% | 4% K90 | 279–292 | 1350 | 75 | <5% | 50% |

-continued

Copolyaramide from (0.8 TPC + 0.2 IPC) and
(0.7 BAP + 0.3 MPD)
Polymer dope $c_2$ = 20% w/w in NMP, [η] = 95 cm³/g

| Conc. $c2$ in NMP (1) | additives | membrane thick- ness (μ) | water flux (2) (l/m²h) | water flux (3) (l/m²h) | retention K30 | T2000 |
|---|---|---|---|---|---|---|
| 8% | 4% K90 2% Aerosil | 289–303 | 1800 | 82 | <5% | 33% |

(1) relative to the polymer solution
(2) water flux of the native, water wet membrane measured as specified above
(3) water flux measured under identical conditions of a membrane sample dried for 2 h at 50° C. in an oven. No glycerol or any other plasticizer was used to stabilize the porous membrane structure.

Comparative Example 6

A polyaramide which is not a polyetheramide according to the instant invention was synthesized from ≧95 molar % of TPC, 25 mol % PPD, 50 mol % 3,3'-dimethyl-4,4'-diamino-biphenyl, and 25 mol % 1,4-bis-(4'-aminophenoxy)-benzene in NMP as a solvent. The polyaramide concentration was 6% w/w. A portion of 4% w/w PVP K30 based on the mass of the solution was added. The dope was casted onto a polypropylene fabric and coagulated in water at 22° C. The resulting water wet membrane had a water flux of 460 l/m²h at 3 bar and a retention value for PVP K30 of 87%.

A sample of the membrane was dried without using glycerol or another stabilizing pore filler. Afterwards the membrane was not permeable for water at pressures up to 10 bar.

We claim:

1. A semipermeable, porous, asymmetric membrane comprising a structure which contains a polyetheramide which consists essentially of one or more recurring structural units of the formula (I)

and, based on the sum of (II) and (III), 15 to 100 molar % of structural units of the formula (II)

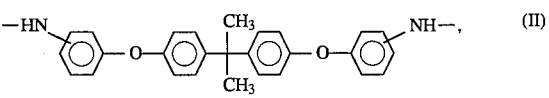

and, based on the sum of (II) and (III), 0 to 85 molar % of structural units of the formula (III)

where the ratio of the sum of (II) and (III) to (I) is 0.90 up to 1.10, and —Ar— and —Ar'— may be the same or different and have the following meaning: a divalent, aromatic or heteroaromatic radical, where the two carbonyl groups of the radical are located on unadjacent ring carbon atoms (i.e. in para- or meta-position) and the radical is unsubstituted or substituted by one or two branched or unbranched $C_1$–$C_3$-alkyl or $C_1$–$C_3$-alkoxy radicals, aryl or aryloxy radicals or $C_1$–$C_6$-perfluoroalkyl or $C_1$–$C_6$-perfluoroalkoxy radicals or by fluorine, chlorine, bromine or iodine.

2. The semipermeable porous, asymmetric membrane as claimed in claim 1, wherein the polyetheramide has a Staudinger index in the range 50 to 1,000 cm³/g.

3. The membrane as claimed in claim 1, wherein the structure is a flat membrane having a thickness in the range 10 to 300 μm.

4. The membrane as claimed in claim 1, wherein the structure is arranged on a support layer, permeable to flowable media, comprised of plastic nonwoven web or of a fabric.

5. The membrane as claimed in claim 4, wherein the support layer comprises a plastic nonwoven web and contains polyethylene terephthalate or polypropylene.

6. The membrane as claimed in claim 1, wherein the structure is a hollow fiber membrane.

7. A process for the production of the membrane as claimed in claim 1, in which a polymer solution is spread as a liquid layer on a flat support and then a precipitant liquid is applied to the liquid layer, which precipitant liquid is miscible with a solvent of the solution, but in which the polymers dissolved in the polymer solution are precipitated as a membrane, wherein the solvent contains an aprotic polar substance of the amide type as the major constituent and the polymer solution has a concentration in the range from 3 to 50% by weight of polymers.

8. The process as claimed in claim 7, wherein volatile substances are used as further constituents of the solvent.

9. The process as claimed in claim 8, wherein the volatile substances are selected from the group consisting of tetrahydrofuran, acetone and methylene chloride.

10. The process as claimed in claim 7, wherein one or more alcohols are used as the precipitant liquid.

11. The process as claimed in claim 10, wherein the one or more alcohols are selected from the group consisting of methanol, ethanol, isopropanol, ethylene glycol and glycerol.

12. The process as claimed in claim 7, wherein the aprotic polar substance is N-dimethylacetamide.

13. The process as claimed in claim 7, wherein the aprotic polar substance is N-methyl-2-pyrrolidone.

14. The process as claimed in claim 7, wherein the polymer solution has a concentration in the range from 5 to 35% by weight.

15. The semipermeable, porous, asymmetric membrane as claimed in claim 1, wherein the polyetheramide has a Staudinger index in the range 50 to 500 $cm^3/g$.

16. The membrane as claimed in claim 1, wherein the membrane has a water permeability at 3 bar of at least 10 $l/m^2h$ after being dried directly from a water wet state without using any pore fillers or plasticizers.

17. The membrane as claimed in claim 1, wherein the membrane has a water permeability at 3 bar of at least 25 $l/m^2h$ after being dried directly from a water wet state without using any pore fillers or plasticizers.

* * * * *